US008145871B2

(12) United States Patent
Pafumi et al.

(10) Patent No.: US 8,145,871 B2
(45) Date of Patent: Mar. 27, 2012

(54) DYNAMIC ALLOCATION OF VIRTUAL REAL MEMORY FOR APPLICATIONS BASED ON MONITORED USAGE

(75) Inventors: James A. Pafumi, Leander, TX (US); Veena Patwari, Austin, TX (US); Morgan J. Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 12/135,468

(22) Filed: Jun. 9, 2008

(65) Prior Publication Data

US 2009/0307457 A1 Dec. 10, 2009

(51) Int. Cl.
*G06F 12/00* (2006.01)

(52) U.S. Cl. .................... 711/170; 711/E12.079

(58) Field of Classification Search ............ 711/147, 711/148, 170, E12.079, 202
See application file for complete search history.

(56) References Cited

U.S. PATENT DOCUMENTS

| 4,761,737 | A | 8/1988 | Duvall et al. |
| 5,873,124 | A | 2/1999 | Draves |
| 7,058,786 | B1 | 6/2006 | Oliveri |
| 7,219,206 | B1 | 5/2007 | McPolin |
| 2002/0129082 | A1 * | 9/2002 | Baskey et al. ............ 709/102 |
| 2003/0158884 | A1 | 8/2003 | Alford |
| 2004/0078532 | A1 | 4/2004 | Tremaine |
| 2004/0143664 | A1 * | 7/2004 | Usa et al. ................ 709/226 |
| 2005/0240932 | A1 | 10/2005 | Billau |
| 2005/0262505 | A1 | 11/2005 | Esfahany |
| 2006/0212870 | A1 * | 9/2006 | Arndt et al. ............. 718/104 |
| 2007/0168299 | A1 | 7/2007 | Engbersen |
| 2007/0168635 | A1 | 7/2007 | Allen |
| 2007/0288720 | A1 | 12/2007 | Cholleti et al. |
| 2008/0126579 | A1 | 5/2008 | Corneli |
| 2008/0147956 | A1 * | 6/2008 | Rawson .................... 711/6 |
| 2009/0006801 | A1 * | 1/2009 | Shultz et al. ............ 711/170 |
| 2009/0113422 | A1 * | 4/2009 | Kani ......................... 718/1 |

FOREIGN PATENT DOCUMENTS

WO WO 03/088046 10/2003

OTHER PUBLICATIONS

Mark Cohen: "AIX Micropartitioning" [Online] 2006, XP002544571—URL:http://www.cmgitalia.it/PDF/aixm_icropartitioning.pdf> [retrieved on Sep. 7, 2009].
ISR including PCT transmittal, & Written Opinion, From the International Searching Authority, mailed Sep. 24, 2009; Applicant : International Business Machines Corporation, International Application No. PCT/EP2009/056218, pp. 10.

* cited by examiner

*Primary Examiner* — Pierre-Michel Bataille
(74) *Attorney, Agent, or Firm* — Stephen J. Walder, Jr.; David A. Mims, Jr.

(57) ABSTRACT

Mechanisms for dynamic reallocation of memory to an application, the memory being from a pool of virtual real memory allocated to a virtual client that executes the application, are disclosed. In one embodiment, a virtual client is allocated a pool of virtual real memory. A subset of this pool of virtual real memory is a block of memory allocated for use by an application. The allocation may be stated as a range of allocated memory with an upper and lower limit. The application calls a kernel service when it thinks it needs a new allocation of memory. The new allocation is established by a power hypervisor connected to the virtual client. Memory is exported by way of a Paging Space Partition.

20 Claims, 6 Drawing Sheets

DYNAMIC ALLOCATION OF VIRTUAL REAL MEMORY FOR APPLICATIONS BASED ON MONITORED USAGE

BACKGROUND

This written description is in the field of access to physical memory in a server. More particularly, the description relates to virtual memory allocation for an application running on the server.

Many different types of computing systems have attained widespread use around the world. These computing systems include personal computers, servers, mainframes and a wide variety of stand-alone and embedded computing devices. Sprawling client-server systems exist, with applications and information spread across, many PC networks, mainframes and minicomputers. In a distributed system connected by networks, a user may access many application programs, databases, network systems, operating systems and mainframe applications. Computers provide individuals and businesses with a host of software applications including word processing, spreadsheet, and accounting. Further, networks enable high speed communication between people in diverse locations by way of e-mail, websites, instant messaging, and web-conferencing.

A common architecture for high performance, single-chip microprocessors is the reduced instruction set, computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point. Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

Thus, in a modern system, a plurality of computers—including servers—are connected together through a network. Each computer may run application programs for performing certain functions. These application programs may include word-processing, e-mail, graphics, document viewing and mark-up, spreadsheet, database, music player, internet browser, photo-shop, games, anti-virus, as well as a host of other application programs too numerous to mention.

Servers are provided to connect a plurality of computers to the Internet or an intranet. Each server may be logically partitioned into a plurality of virtual clients which act and appear to a computer connected to the server as, if the virtual client is itself a server. Each virtual client has access to memory external to the server such as in a Storage Area Network (SAN). To provide this access a Power Hypervisor (PHYP) controls access of each virtual client to the physical storage through a Virtual Input/Output Server (VIOS), which is itself a logical partition.

Virtual Real Memory (VRM) allows the Operating System (OS) to treat memory on the server as virtual memory. Systems can be enabled to use VRM and the firmware manages read and write transactions to the system's virtual memory and sends those, requests to a block storage device. Virtual Real Memory uses a specialized Virtual I/O Server (VIOS) called a Paging Space Partition (PSP) to provide read and write services between firmware and a block storage device. Disks and optical devices attached to a physical adapter connected to the Virtual I/O Server logical partition can be shared by one or more client logical partitions. The Virtual I/O Server may be a standard storage subsystem that provides standard Small Computer Service Interface (SCSI)-compliant Logical Unit Numbers (LUN). The Virtual I/O Server is capable of exporting a pool of heterogeneous, physical storage as a homogeneous pool of block storage in the form of SCSI disks.

On high end servers many customers are moving toward having all of their storage located on the Storage Area Network (SAN). The SAN may include storage devices connected by way of Fibre Channel or SCSI (Small Computer System Interface). These types of devices may have a high latency dependent on the fabric or network they are on. In a conventional configuration, the root volume group (rootvg) is on the SAN device and therefore the paging space has a higher latency. Critical applications may need more memory or paging devices with less latency. Moreover, applications are typically restricted to a single logical partition (LPAR). If the logical partition gets overloaded and decreases performance, other applications running on the server will also see degradation of performance.

BRIEF SUMMARY

The present invention provides systems, methods and media for dynamic reallocation of memory to an application from a pool of virtual real memory allocated to a virtual client that executes the application. One embodiment is a system for allocation of memory to an application associated with a virtual client logical partition in a server. The embodiment comprises a power hypervisor to record and control memory access by a virtual client logical partition of the server and to change an amount of virtual real memory allocated to the application in response to a kernel service message. The embodiment further comprises a paging space partition Virtual I/O Server (VIOS) to transmit data between the power hypervisor and a physical storage device. The embodiment comprises a monitor to monitor an amount of memory used by the application. A kernel service stored in the server as part of an operating system of the server receives a request from an application for a change in virtual real memory of the virtual client to be allocated to the application, and communicates with the power hypervisor to cause the power hypervisor to change the virtual real memory allocated to the application.

Another embodiment is a method to dynamically allocate memory to an application of a virtual client in a server. The method comprises recording and controlling memory access by a virtual client logical partition of the server. The method further comprises changing an amount of virtual real memory allocated to the application in response to a kernel service message. Data is transmitted between the power hypervisor and a physical storage device. The memory required by the application or expected to be needed by the application is monitored. The method further comprises determining from the monitoring if an amount of memory allocated to the application is to change. The method further comprises dynamically reallocating an amount of virtual real memory to the application in response to a determination that an amount to be allocated is to change.

Another embodiment is a computer program product comprising a computer useable medium having a computer readable program, wherein the computer readable program when executed on a computer causes the computer to perform functions for dynamically reallocating memory to an application associated with a virtual client on the server. The operations include recording and controlling memory access by a virtual client logical partition of the server and changing an amount of virtual real memory allocated to the application in response to a kernel service message. The operations further comprise emulating the virtual client and monitoring an amount of memory used by the application. The operations comprise determining from the monitoring if an amount of memory allocated to the application is to change; and dynamically reallocating an amount of virtual real memory to the application in response to a determination that an amount to be allocated is to change.

BRIEF DESCRIPTION OF THE SEVERAL VIEWS OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for dynamic reallocation of memory to an application, the memory from a pool of virtual real memory allocated to a virtual client that executes the application, are disclosed. In one embodiment, a virtual client is allocated a pool of virtual real memory. A subset of this pool of virtual real memory is a block of memory allocated for use by an application. The allocation may be stated as a range of allocated memory with an upper and lower limit. The application calls a kernel service when it thinks it needs a new allocation of memory. The new allocation is established by a power hypervisor connected to the virtual client. Memory is exported by way of a Paging Space Partition.

Figure 1:
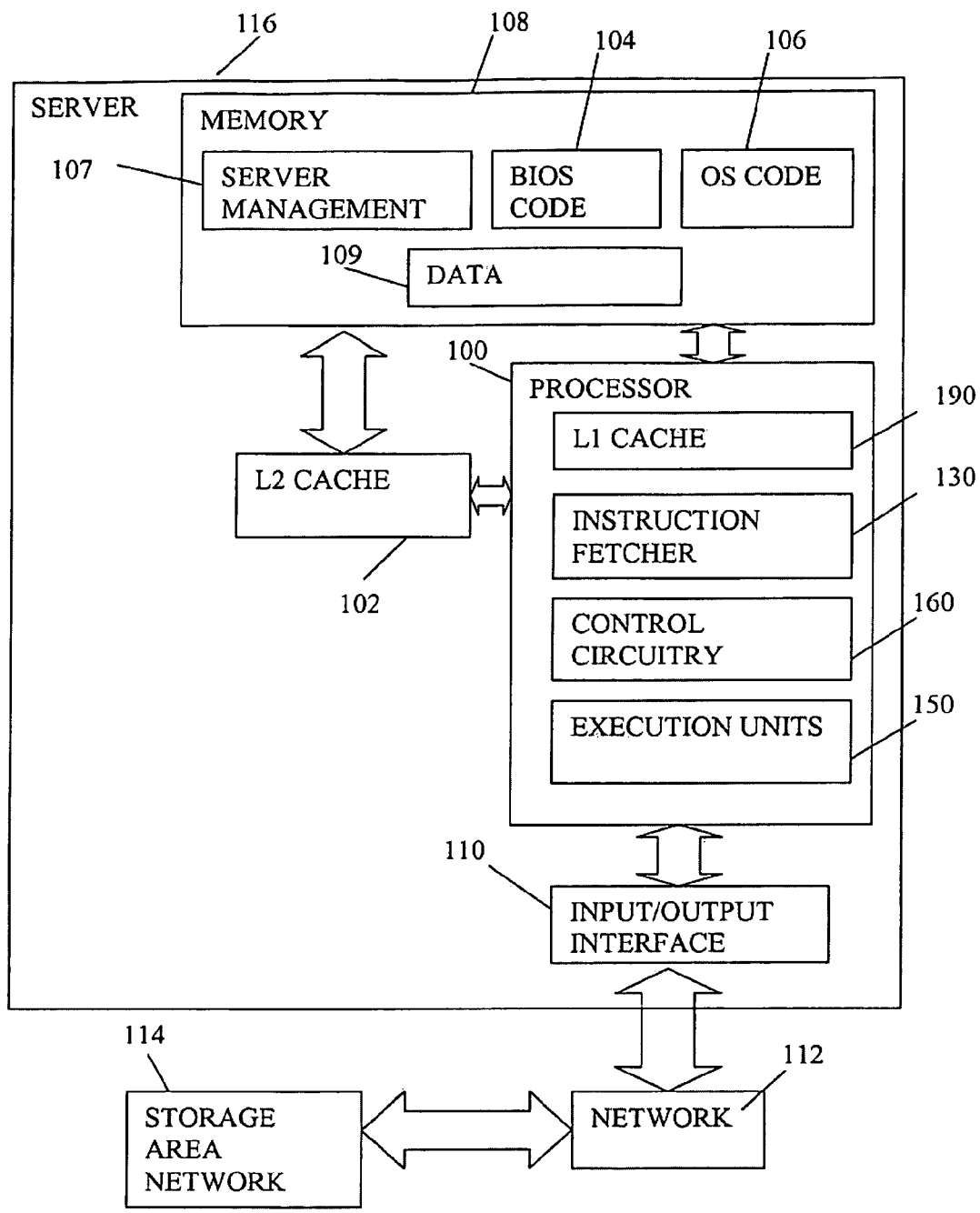
FIG. 1 depicts an embodiment of a server within a network; the server can emulate virtual clients and VIOS.

FIG. 1 shows a server 116 (herein sometimes referred to as a machine). Server 116 comprises at least one processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of server 116. Digital system 116 comprises a level 2 (L2) cache 102 located physically close to processor 100. Memory 108 also stores other programs for execution by processor 100 and stores data 109.

In an embodiment, memory 108 stores server management code 107 to manage and control access to physical memory storage, to maintain logical partitions, to implement the VIOS, the PHYP, and other functions. In some embodiments, multiple virtual clients can be emulated by a single processor. In some embodiments, mores than one processor in the server may emulate a single virtual client. Each virtual client may appear as a server to a computer or other device connected to server 116. Each virtual client may execute application programs. These application programs may comprise, for example, a database. The database may then be accessed by a computer connected to a network served by the server. In some embodiments, the application code itself may reside on a physical paging device connected to the server. The physical paging device may be connected to multiple servers.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. In one embodiment, these instructions include instructions to identify al key set or key set group named by an interface module. The instructions cause processor 100 to determine if the requesting application program is authorized to receive the requested keys. The instructions further cause processor 100 to retrieve the requested keys from a key store and to thereby produce a map of the keys.

Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. In a superscalar architecture, different execution units operate in parallel. Thus, execution units 150 comprise a set of units of different types operating in parallel to execute instructions to implement an encryption key management process.

Control circuitry 160 controls instruction fetcher 130 and execution units 150. Control circuitry 160 also receives information relevant to control decisions from execution units 150. For example, control circuitry 160 is notified in the event of a data cache miss in the execution pipeline to process a stall.

Server 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 100 may also communicate with a network 112 by way of Input/Output Device 110. The network connects server 116 with a storage area network of physical memory storage devices 114. These devices may include tape drive storage or hard disk arrays or other types of memory.

Thus, in one mode of operation of server 116, the L2 cache receives from memory 108 data and instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. The L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units of execution units 150 may be adapted to execute a specific set of instructions. Instructions can be submitted to different execution units for execution in parallel. Data processed by execution units 150 are storable in and accessible from integer register files and floating point register files (not shown.) Data stored in these register files can also come from or be transferred to on-board L1 cache 190 or an external cache or memory. The processor can load data from memory, such as L1 cache, to a register of the processor by executing a load instruction. The processor can store data into memory from a register by executing a store instruction.

A server 116 will have its own memory for storing its operating system, BIOS, and the code for executing application program and encryption key processing code, as well as files and data. The memory of a server comprises Read-Only-Memory (ROM), cache memory implemented in DRAM and SRAM, a hard disk drive, CD drives and DVD drives. A server also has its own memory and may control access to other memory such as tape drives and hard disk arrays. Each server may store and execute its own application programs. Thus, some application programs, such as databases, may reside in the server and these programs may be available to computers in the network.

Figure 2:
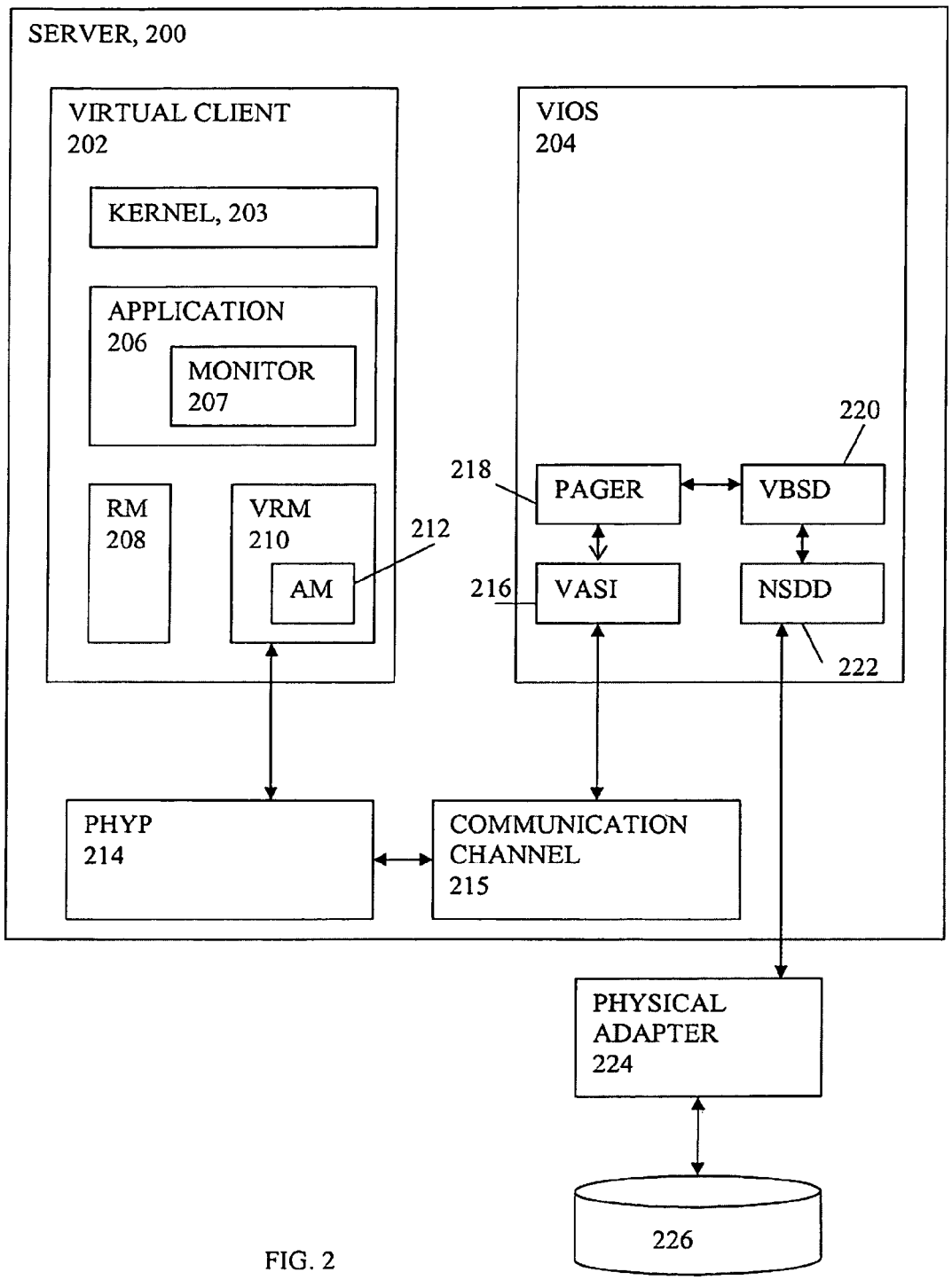
FIG. 2 depicts an embodiment of a system capable of dynamic reallocation of memory.

A server 116 may store computer code 107 to perform the various functions of the server, including, forming logical partitions (LPAR), emulating virtual clients which may each appear as a server to external devices such as computers in the network, emulating a Power Hypervisor (PHYP), and a Virtual I/O Server (VIOS). FIG. 2 shows a logical representation of a server 200 emulating a plurality of virtual clients 202, a PHYP 214 and a VIOS 204 to manage the allocation of memory to the virtual clients and to handle memory transfer to or from the physical storage 226. Virtual Real Memory uses a specialized Virtual I/O Server (VIOS) called a Paging Space Partition (PSP) to provide read and write services between firmware and a block storage device. This Paging Space Partition contains a VASI, Pager, and Virtual Block Storage Device drivers to communicate between firmware and the block storage devices.

Thus, a virtual client 202 is a logical partition of server 200. Virtual client 202 performs its functions by way of the execution of computer code by, the processor of server 200. Thus, the functions of an application 206 associated with virtual client 202 may be performed. For example, virtual client 202 may comprise database functions so that it appears to be a database accessible by a computer in the network. Virtual client 202 comprises real memory 108 that is in server 200, and comprises virtual real memory (VRM) 210 which is the memory of external storage 226 allocated to virtual client 202.

Virtual Real Memory provides a mechanism to over-subscribe memory to specific Logical Partitions (LPAR). For example, a Central Electronics Complex (CEC) with 4 Giga Bytes (GB) of real memory may over-subscribe to LPARs allowing the total amount of memory provided to all the LPARs to exceed 4 GB. This is done using the VIOS, which provides page-in and page-out services for disks. The Power Hypervisor uses this service to page in and page out memory as needed. With each application there is associated application memory 212 that is part of VRM 210. As will be seen, the size of application memory 212 is dynamically allocated by a kernel service of the operating system of server 200.

VIOS 204 is software that is located in a logical partition of server 200. This software facilitates the sharing of physical I/O resources between the client logical partitions 202 within server 200. VIOS 204 provides virtual Small Computer System Interface (SCSI) target and Shared Ethernet Adapter capability to client logical partitions within the system, allowing the client logical partitions to share SCSI devices and Ethernet adapters. VIOS 204 software requires that the logical partition be dedicated solely for its use. Disks and optical devices attached to a physical adapter 224 connected to a Native Storage Device Driver (NSDD) 222 of VIOS 204 can be shared by virtual clients 202.

The Virtual I/O Server provides standard SCSI-compliant Logical Unit Numbers (LUN). The Virtual I/O Server is capable of exporting a pool of heterogeneous physical storage as a homogeneous pool of block storage in the form of SCSI disks. Physical disks owned by the Virtual I/O Server can be either exported and assigned to a client logical partition as a whole or can be partitioned into logical volumes. The logical volumes can then be assigned to different partitions.

PHYP 214 is between the virtual clients 202 and VIOS 204. PHYP 214 acts as a memory manager controlling access to memory and security functions to protect data in memory of a first virtual client from being accessed by a second virtual client. PHYP 214 contains a record of which memory of storage 226 is allocated to which virtual client 202 and what memory is available to be allocated to a virtual client. PHYP 214 also controls time slicing, management of all hardware interrupts, dynamic movement of resources across multiple operating systems, and dispatching of logical partition workloads.

PHYP 214 is connected to a Virtual Asynchronous Interface (VASI) 216 through a communication channel 215. VASI 216 is an interface especially adapted to communicate with PHYP 214 and to receive and transmit data between the PHYP and VASI 216. VASI 216 communicates with a pager 218. Pager 218 communicates with a Virtual Block Storage Device (VBSD) 220. VBSD 220 communicates with a Native Storage Device Driver (NSDD) 222, which in turn communicates with Physical Adapter 224.

VASI 216 is the interface between the Command/Response Queue (CRQ) commands sent by the Hypervisor 214 and the Common Data-Link Interface (CDLI) interface observed by the Pager module 218. Pager module 218 receives I/O (Input/Output) commands in the CDLI format and converts them into generic I/O requests understood by VBSD 220. VBSD 220 issues commands to the native I/O stack of NSDD 222. PHYP 214 will send a request for a read or a write to VASI 216 which will then pass that request on to Pager 218. Pager 218 will take the request, convert it into a command readable by VBSD 220, and communicate that request to VBSD 220. VBSD 220 will then send the request to its block storage device and then return the response to Pager 218. Pager 218 will then reply to the VASI's request with the response given by VBSD 220. VASI 216 will then respond to PHYP 214.

Embodiments provide a mechanism that enables an application program to dynamically change the amount of application memory 212 within VRM 210 that is allocated to it. The amount of memory allocated to the application is changed by calling a kernel service 203. This allows an application to retrieve memory when needed even if there is no more physical memory available on the system. The kernel service 203 may be implemented as part of the operating system and stored on a hard drive of the server. To determine if more or less memory is needed by the application, the application has a monitor subcomponent 207 to monitor memory use by the application. Having more memory reduces the amount of page faults that will be seen and, hence, there will be, less use of paging services provided by a rootvg (root volume group) of the operating system.

The kernel service 203 calls into PHYP 214 and interfaces with the existing VRM interface to dynamically change entitled memory for the application that calls kernel service 203. The Paging Service Partition (PSP) 204 provides the allocated storage information to PHYP 214. To address latency, the PSP will only use low latency storage, such as internal or Serial Attached SCSI (SAS) attached storage devices. This allocated internal storage is used by PHYP 214 and will have less latency than the paging device on the SAN. Internal storage is typically very limited, so reserving it solely for use by the PSP helps provide those low latency devices to the partitions that need them.

Figure 3:
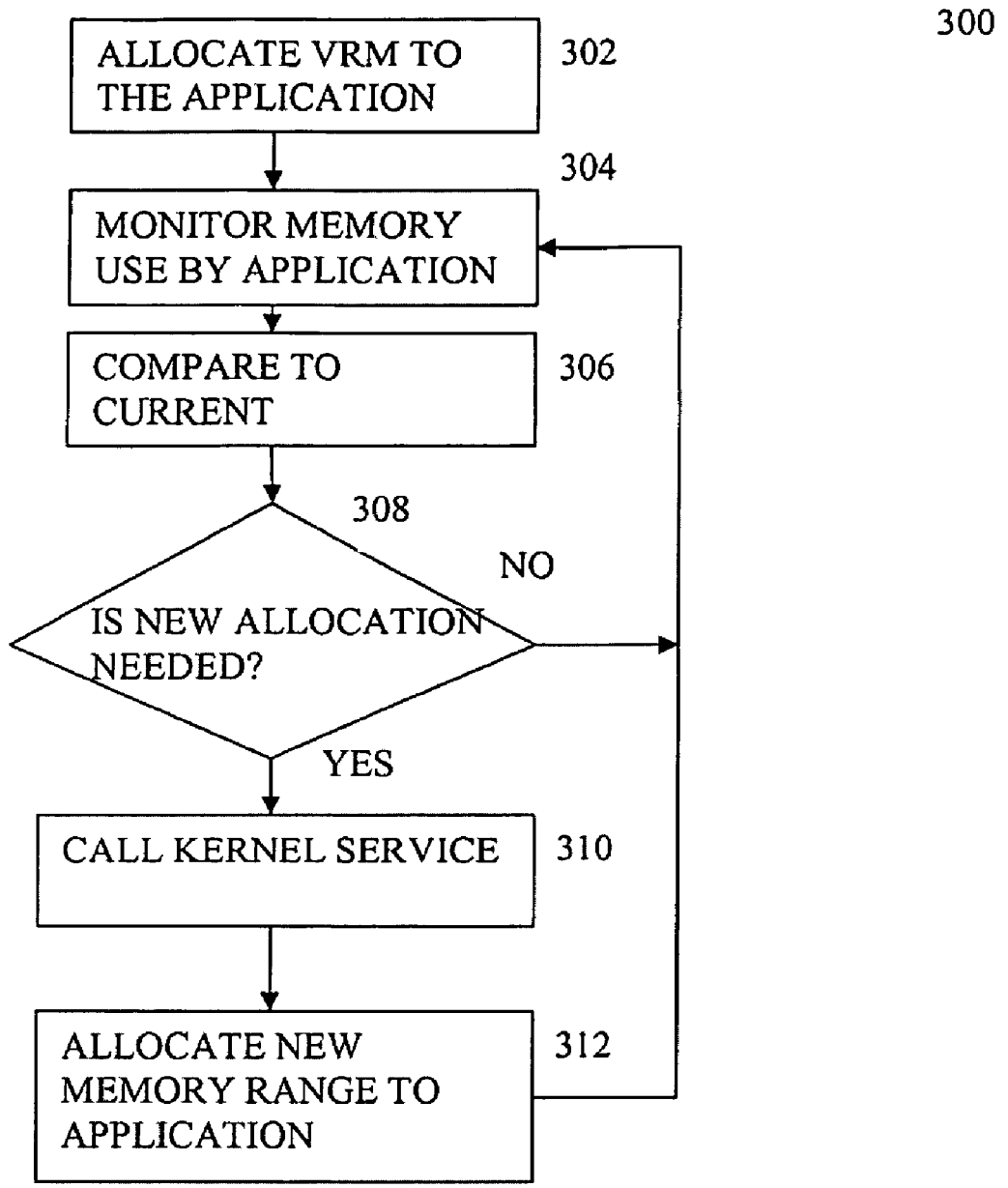
FIG. 3 depicts a flowchart of an embodiment for monitoring and reallocating memory.

FIG. 3 shows an embodiment of a flow chart 300 for dynamic reallocation of memory by a kernel service. Initially, an amount of the VRM 210 allocated to the application's use is specified prior to using the application program 206 (element 302). This initial amount of application memory 212 is a subset of the VRM 210 assigned to the virtual client partition 202. In one embodiment, the amount of memory allocated is a range of memory allocated to the application, the range specifying an upper limit and lower limit. During subsequent use of the application 206, the application monitors its use of the VRM assigned to the virtual client (element 304).

In one embodiment, current usage is compared to the current memory allocation (element 306). In another embodiment, expected usage is compared to the current memory allocation (element 306). In either embodiment, the comparison is evaluated to determine if a new allocation of application memory is needed (element 308). If not, the monitoring process (element 304) continues. If a new allocation of application memory is needed, the application calls a kernel service 203 of the operating system of the server (element 310). The kernel service 203 communicates with PHYP 214 to change how much memory is allocated to this application (element 312). Then the monitoring process continues (element 304).

Figure 4:
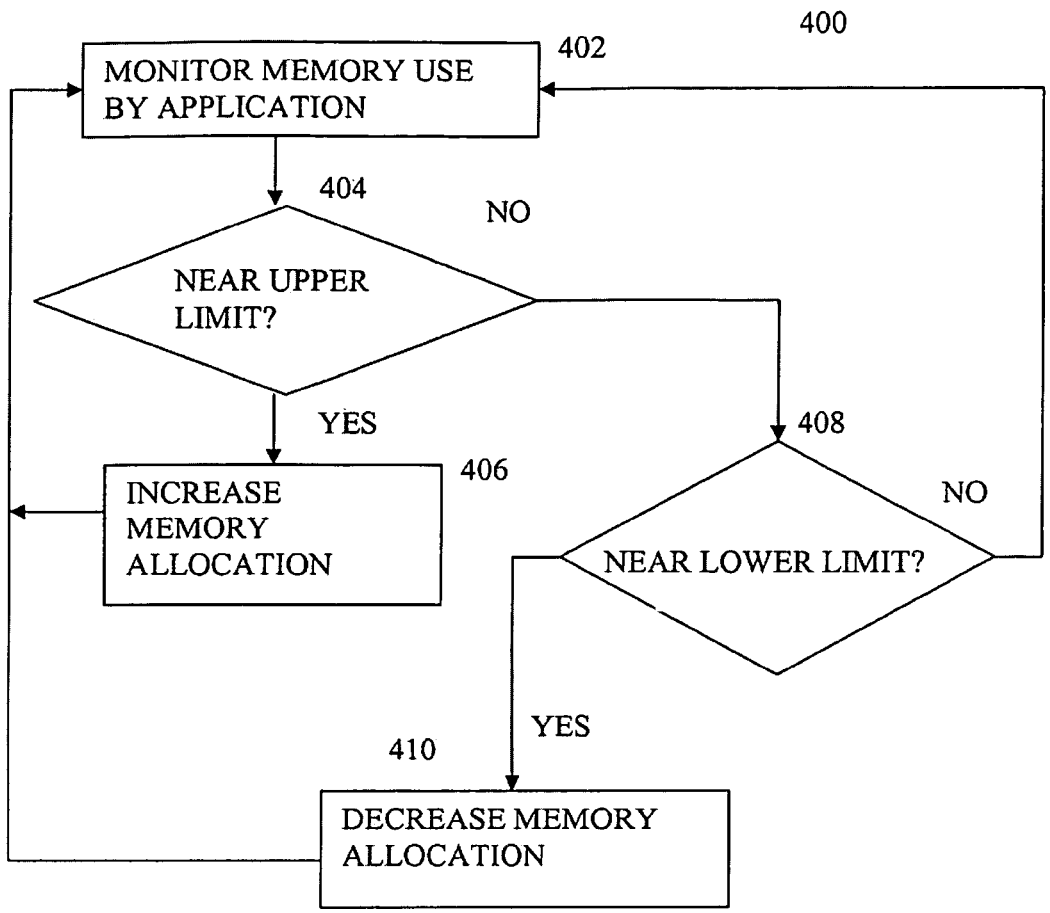
FIG. 4 depicts a more detailed flowchart of an embodiment for monitoring and reallocating memory.

FIG. 4 shows a flow chart 400 that depicts more detail of the monitoring and comparison process for determining if a new allocation of memory is needed. During execution of the application, the application monitors its use of memory (element 402) to ensure that memory usage is within the allocated range. The system determines if monitored memory usage is near the upper limit of the allocated range (element 404). Thus, a threshold may be specified that is below but close to the upper limit of the allocated range. If memory needed by the application is above this threshold, the system increases the upper limit of the allocated range (element 406).

In some embodiments, the system also checks to make sure the increase in allocation of memory does not exceed the limit of VRM allocated to the virtual client. If the memory usage is not near the upper limit (element 404), then the system checks if the memory usage is near or below the lower limit of the previous range of VRM allocated to the application (element 408). Thus, if memory use is lower than originally anticipated, the memory allocated to the application is reduced (element 410).

Figure 5:
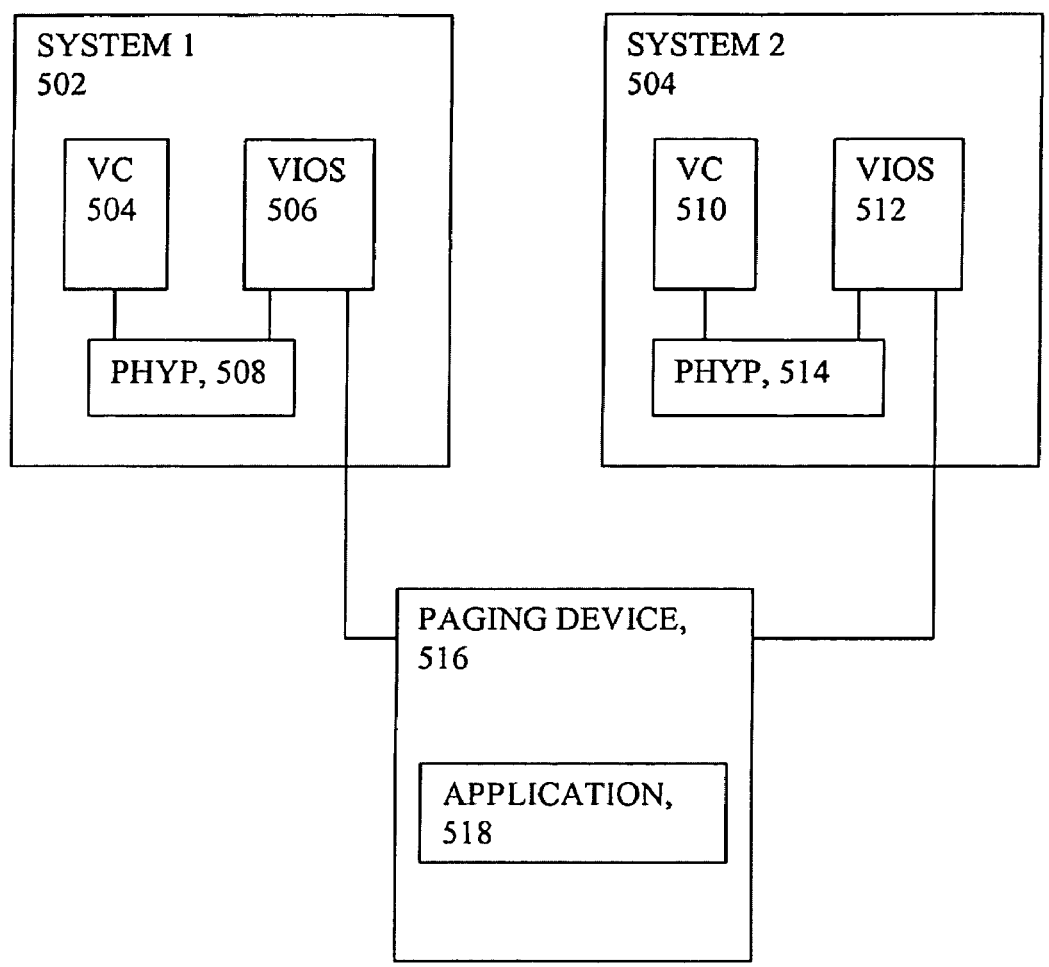
FIG. 5 depicts an embodiment of multiple systems with an application running on a paging device connected to the multiple systems.

In FIG. 2, the application is shown stored with the virtual client indicating that the memory for storing the executable application program (as distinguished from the memory used by the application during execution) is local to the virtual client. FIG. 5 shows an embodiment wherein the application is itself stored not in the server but in a paging device such as a SAN disk. Thus, in one embodiment the application to be run by a virtual client 504 or 510 is located in a paging device 516. The paging device can be attached to multiple systems, as shown, each system having its own virtual clients 504, 510, VIOS 506, 512, and PHYP 508, 514.

The paging device is seen by the LPAR as memory. The LPAR has no idea that the memory is actually stored on a remote storage device (i.e. a SAN disk). Attaching the paging device to multiple systems allows multiple systems access to that memory space. The memory space now has the ability to move from one system to another. The application is installed and run on that paging device (similar to a RAM Disk) and since the paging device can migrate from one system to another so can the application.

For example an application like gvim (a common text editing program) can be installed and run on the paging device and be associated with a source LPAR. Since the application is actually running on the paging device, which can be a SAN disk, another LPAR can access that same paging space device. A user specified event could cause the source LPAR to stop using the application and then have the destination LPAR using that same application. This allows the application to move from running on the source LPAR to the destination LPAR.

Thus, for example, a virtual client 504 of system 1, (502), may be "running" the application 518 when, for some reason it is necessary to bring system 1 out of service. In this case, a virtual client 510 of system 2, (504), may be called to run the application 518. Since application 518 is on a paging device 516 connected to both system 1 and system 2, the application can be run by either system. Thus, in one embodiment, PHYP 508 will control access to memory by virtual clients of system 1 and PHYP 514 will control access to memory by virtual clients of system 2. In another embodiment, one power hypervisor may control access to memory by both system 1 and system 2.

Figure 6:
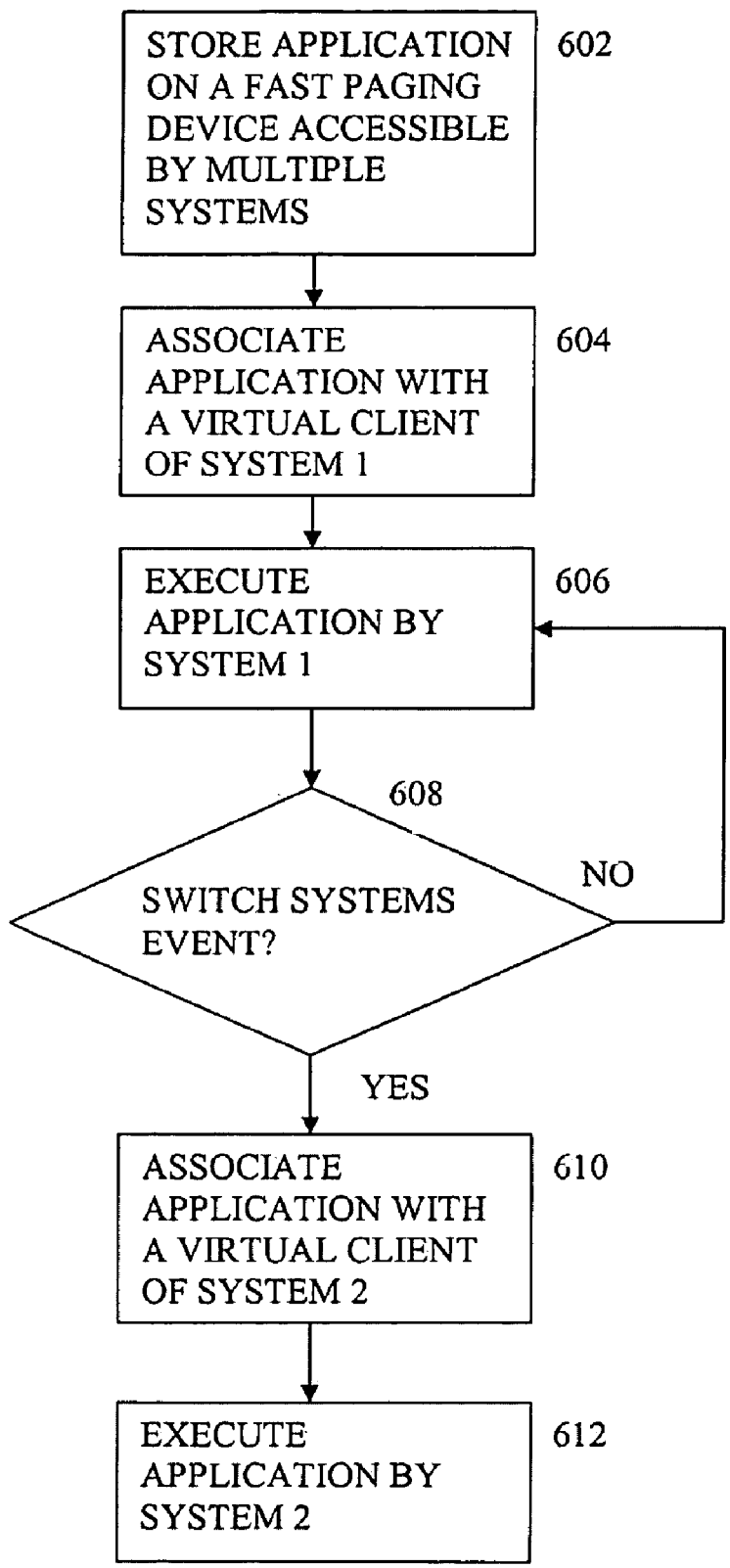
FIG. 6 depicts a flowchart of an embodiment for switching systems when the application is running on a paging device connected to multiple systems.

FIG. 6 shows a flowchart 600 for an embodiment that provides the application in a paging device to be accessed by multiple systems. Initially, the application is stored on a fast paging device connected to multiple systems (element 602). Then, the application is associated with a virtual client of a first system (element 604). That is, the virtual client of the first system executes the application (element 606). During execution, an event may occur that warrants the application to be switched from being run by system 1 to being run by system 2 (element 608). For example, it might be time to shut down system 1 for maintenance. In this event, the application is associated with a virtual client of system 2 (element 610), and the application is then executed by system 2 (element 612).

Thus, in some embodiments, virtual real memory of a virtual client may be dynamically reallocated to the application even though the application itself physically resides on physical storage exterior to the server where the virtual client resides. That is, a virtual client may execute an application that is stored in physical storage rather than the server. The memory required by the application during its execution is taken from a pool of virtual real memory allocated to the virtual client.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a server such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a computer program product containing instructions effective, when executing in a data processing system, to cause the system to perform a series of operations for dynamically allocating virtual real memory to an application. The series of operations generally include recording and controlling memory access by a virtual client logical partition of the server. The operations also include changing an amount of virtual real memory allocated to the application in response to a kernel service message. The operations include emulating the virtual client. The computer is also caused to monitor an amount of memory used by the application. The computer also determines from the monitoring, if an amount of memory allocated to the application is to change. The operations also include dynamically reallocating an amount of virtual real memory to the application in response to a determination that an amount to be allocated is to change.

In some embodiments, determining if an amount of memory allocated to the application is to change comprises comparing an actual memory use of the application to an upper limit. Also, in some embodiments, determining if an amount of memory allocated to the application is to change comprises comparing an actual memory use of the application to a lower limit. Or the comparison may be made of expected memory usage and allocated memory. In one embodiment, changing an amount of virtual real memory allocated to an application is initiated by a kernel service of an operating system of the server.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method to dynamically allocate memory to an application of a virtual client in a server, comprising:
   recording and controlling memory access by a virtual client logical partition of the server and changing an amount of virtual real memory allocated to the application in response to a kernel service message;
   transmitting data between the power hypervisor and a physical storage device;
   monitoring an actual amount of virtual real memory used by the application;
   determining from the monitoring if an amount of memory allocated to the application is to change; and
   dynamically reallocating an amount of virtual real memory to the application, based on the amount of virtual real memory used by the application, in response to a determination that an amount to be allocated is to change.

2. The method of claim 1, wherein determining if an amount of memory allocated to the application is to change comprises comparing an expected memory use of the application to an upper limit.

3. The method of claim 2, wherein if the comparison determines that the expected memory use is at least a specified amount, the amount of memory reallocated to the application is increased.

4. The method of claim 1, wherein determining if an amount of memory allocated to the application is to change comprises comparing an expected memory use of the application to a lower limit.

5. The method of claim 4, wherein if the comparison determines that the expected memory use is less than a specified amount, the amount of memory reallocated to the application is decreased.

6. The method of claim 1, wherein changing an amount of virtual real memory allocated to an application is initiated by a kernel service of an operating system of the server.

7. The method of claim 6, wherein the kernel service runs within the virtual client.

8. A system for allocation of memory to an application associated with a virtual client logical partition in a server, comprising:
   a power hypervisor to record and control memory access by a virtual client logical partition of the server and to change an amount of virtual real memory allocated to the application in response to a kernel service message;
   a paging space partition Virtual I/O Server (VIOS) to transmit data between the power hypervisor and a physical storage device;
   a monitor to monitor an actual amount of virtual real memory used by the application; and
   a kernel service stored in the server as part of an operating system of the server to receive a request from an application for a change in virtual real memory of the virtual client to be allocated to the application based on the amount of virtual real memory used by the application, and to communicate with the power hypervisor, in response to receiving the request, to cause the power hypervisor to change the virtual real memory allocated to the application.

9. The system of claim 8, further comprising a comparator within the monitor to compare the actual amount of virtual real memory used by the application to an upper limit of memory use.

10. The system of claim 8, further comprising a comparator within the monitor to compare the actual amount of virtual real memory used by the application to a lower limit of memory use.

11. The system of claim 8, further comprising a comparator within the monitor to compare an expected amount of virtual real memory used by the application to an upper limit of memory use.

12. The system of claim 8, further comprising a comparator within the monitor to compare an expected amount of virtual real memory used by the application to a lower limit of memory use.

13. The system of claim 8, wherein the kernel service is stored in a hard drive of the server.

14. The system of claim 8, wherein the kernel service runs from within the virtual client logical partition.

15. A computer program product comprising a computer useable storage medium having a computer readable program, wherein the computer readable program when executed on a computer causes the computer to:
   record and control memory access by a virtual client logical partition of the server and changing an amount of virtual real memory allocated to the application in response to a kernel service message;
   emulate the virtual client;
   monitor an actual amount of virtual real memory used by the application;
   determine from the monitoring if an amount of memory allocated to the application is to change; and
   dynamically reallocate an amount of virtual real memory to the application, based on the amount of virtual real memory used by the application, in response to a determination that an amount to be allocated is to change.

16. The computer program product of claim 15, wherein determining if an amount of memory allocated to the application is to change comprises comparing an actual virtual real memory used by the application to an upper limit.

17. The computer program product of claim 15, wherein determining if an amount of memory allocated to the application is to change comprises comparing an actual virtual real memory used by the application to a lower limit.

18. The computer program product of claim 15, wherein determining if an amount of memory allocated to the application is to change comprises comparing an expected memory use of the application to an upper limit.

19. The computer program product of claim 15, wherein determining if an amount of memory allocated to the application is to change comprises comparing an expected memory use of the application to a lower limit.

20. The computer program product of claim 15, wherein changing an amount of virtual real memory allocated to an application is initiated by a kernel service of an operating system of the server.

* * * * *